3,333,004
PRODUCTION OF GLYOXAL
Rolf Platz, Mannheim, and Werner Fuchs, Ludwigshafen (Rhine), Germany, assignors to Badische Anilin- & Soda-Fabrik Aktiengesellschaft, Ludwigshafen (Rhine), Germany
No Drawing. Filed July 11, 1963, Ser. No. 294,262
Claims priority, application Germany, July 18, 1962, B 68,079
7 Claims. (Cl. 260—602)

This invention relates to a new process for the production of glyoxal. More specifically, the invention relates to a process for the production of glyoxal which starts from a material different from those used in the prior art methods and uses a catalyst which has not hitherto been employed for this purpose.

It is known that glyoxal can be prepared by oxidation of acetylene in the gas phase with oxygen, air, nitric acid or nitrogen oxides (U.S. patent specification No. 1,988,455). According to another known method, glyoxal is obtained by oxidation of ethylene glycol (U.S. patent specification No. 2,339,282). By this method however, a product is formed in not very good yields which is difficult to purify and the initial material required is obtained from ethylene only in moderate yields. It is also known that acetaldehyde can be oxidized to glyoxal with nitric acid. For this method, yields of a maximum of 50% are given (Houben-Weyl, Methoden der organischen Chemie, 4th edition, volume VII, 1, page 157).

It is an object of this invention to provide a process which starts from a readily accessible initial material and gives a glyoxal of high purity in good yields. Other objects and advantages of this invention will be apparent from the following description.

In accordance with this invention the said objects and advantages are achieved by reacting ethylene with nitric acid in aqueous medium in the presence of a palladium salt as catalyst at a temperature between 0° and 100° C.

It is known that olefines can be converted by oxidation in an aqueous palladium salt solution into aldehydes (compare, inter alia, Austrian patent specification No. 205,476 and Belgian patent specification No. 570,902). For example, acetaldehyde is obtained in this way from ethylene. The palladium is reduced and must be oxidized again in a suitable way and kept in solution. An addition of cupric salts or ferric salts has been particularly recommended for this purpose. The copper salts and iron salts of low valency, and any palladium which has been deposited after all, are separated from the reaction product and reoxidized, advantageously by treatment of the acid solution with air. The oxidation has also already been carried out by means of nitric acid or nitrogen oxides. Surprisingly, glyoxal is obtained when nitric acid is allowed to act on ethylene in an aqueous solution of a palladium salt. Actually the presence of nitric acid, which yields nitric oxide during the oxidation, should have been avoided because the said conversion of olefines into aldehydes proceeds by way of a palladous-ethylene complex. However, palladium salts are known to form stable complex compounds with nitrogen monoxide. All conditions under which palladous complexes with nitrogen monoxide can form at the expense of the desired palladous-ethylene complexes should therefore have been avoided. It has surprisingly been found that even palladium-nitroso complex compounds are catalysts for the new reaction.

It is obvious that the reaction according to the new process does not proceed via the intermediate stage of acetaldehyde. Yields of up to 65% of the theory are achieved. If the reaction were to proceed via the intermediate stage of acetaldehyde, maximum yields of 45% of the theory could only be obtained because the oxidation of ethylene to acetaldehyde proceeds with yields of about 90% of the theory, whereas the oxidation of acetaldehyde with nitric acid proceeds with yields of 40 to about 50% of the theory. The non-occurrence of acetaldehyde as an intermediate stage also follows from the fact that it is possible to work with very dilute nitric acid solutions, for example with 2% to 5% nitric acid. Acetaldehyde is not oxidized by such dilute nitric acid.

The ethylene need not be pure. On the contrary ethylene of commercial purity or mixtures of ethylene with other gases, for example mixtures of ethylene and ethane, may be used. Other olefines, however, should if possible not be present in too large quantities because the glyoxal is otherwise heavily contaminated.

The reaction according to the new process proceeds in a temperature range between about 0° and about 100° C. It is advantageous to work at temperatures between 30° and 80° C.

The process may be carried out at atmospheric pressure and even under subatmospheric pressure, for example at down to 300 mm. Hg. Superatmospheric pressures, i.e., up to about 30 atmospheres, increase the space-time yields.

The use of palladium salts as catalysts is an essential feature of the process according to this invention. Whether the palladium salts remain unchanged or whether they are converted under the reaction conditions into compounds which are the actual catalysts, is not known. In any case the initial substance is a palladium salt, or a substance which under the reaction conditions will yield a palladium salt. Palladous salts are preferred because of their good accessibility. Palladous chloride, palladous nitrate, palladous sulfate, palladous phosphate, palladous cyanide and palladous oxalate are examples of suitable salts. Examples of suitable complexes of palladous salts with complex forming substances are dinitroso palladous chloride $(PdCl_2.2NO)$, potassium tetrachloropalladate (II) $(K_2PdCl_4)$, palladous potassium oxalate $K_2[Pd(C_2O_4)_2]$ and dinitroso palladous sulfate $Pd(NO)_2SO_4$.

Examples of substances from which palladous salts will form in the reaction mixture are palladium metal, palladous sulfide and palladous oxide hydrate.

Examples of palladium compounds having a valency other than 2 are palladium (III) oxide hydrate, potassium hexachloropalladate (IV), palladium disulfide or palladium (III) fluoride.

It should be noted that the valency of the palladium in the palladium salt or in the substance yielding the palladium salt is without significance. The anion of the palladium salt is also without importance for the success of the reaction, although occassionally a promoting effect of certain anions may be detected. Palladous chloride and palladous nitrate have proved to be best.

The palladium salt is used in an amount of more than 0.0001% by weight with reference to the reaction mixture. It is advantageous to work with the concentration of the catalyst with reference to the reaction mixture between about 0.01 to 1% by weight, particularly between 0.01 and 0.03% by weight. It should be noted however that the said upper limit does not by any means lie in the nature of the reaction but is determined by considerations of expediency. It is possible to use an amount of palladium salt equivalent to the solubility in the reaction mixture. It is even possible to work with saturated solutions which contain undissolved palladium salt. There is no particular advantage in doing so however.

Nitric acid is the oxidizing agent for the process according to this invention. It is used in such an amount that its concentration in the reaction mixture is between 1 and 40% by weight. The best results are achieved by keeping the concentration of nitric acid between 2 and 20% by weight. Since the amount of catalyst is negligible, the amount of water is at first generally (i.e. when no other inert substances are present) the difference between the nitric acid content and 100. In the course of the reaction, this picture changes of course because more and more glyoxal is formed and because nitric acid is consumed in the course of the reaction. The reaction is preferably stopped when the concentration of the nitric acid has fallen below 1% by weight with reference to the reaction mixture.

It is not essential to start from nitric acid, but this may be wholly or partly replaced by nitrogen oxides which give nitric acid under the reaction conditions. Nitrogen oxides which are suitable for the process are nitrogen dioxide, dinitrogen trioxide, dinitrogen tetraoxide and dinitrogen pentoxide. Dinitrogen monoxide is not suitable. Nitrogen monoxide may be used provided oxygen is present at the same time so that higher oxides of nitrogen may form. The coemployment of oxygen is also possible and in some cases even recommendable when starting from a higher nitrogen oxide. The ratio of nitrogen oxide or mixture of nitrogen oxide and oxygen to ethylene is advantageously chosen so that the off-gas contains nitrogen only in the form of dinitrogen monoxide, because in this way the nitrogen oxides are utilized to the best effect.

The process according to the invention may be carried out for example in gas absorption columns or in stirring vessels provided with means for introducing gas. A plurality of units may be arranged in series so that complete reaction of the ethylene is achieved. The gas and catalyst solution may be passed cocurrent or countercurrent. Aqueous glyoxal solutions are obtained which still contain the catalyst. The catalyst may be recovered by conventional methods and used again. For example the metal may be isolated by means of ion exchangers or redox exchangers, or the metal may be electrolytically deposited. It is also possible to carry out the reaction so that toward the end of the reaction when working batchwise or at the end of a reaction path when working continuously, for example in the last vessel of a cascade of stirred vessels, the concentration of nitric acid or oxides of nitrogen is so low that the palladium is deposited by the ethylene. In this method a fine purification may then be carried out with ion exchangers if necessary.

The aqueous glyoxal solution may be used direct for many reactions. It may also be concentrated by distillation however and volatile acids formed as byproducts such as acetic acid, and also carbon dioxide and residual nitric acid, may thus be removed.

Glyoxal is known to be a valuable intermediate, for example for the production of imidazole.

The following examples will further illustrate this invention; parts specified in the following examples are parts by weight, unless otherwise specified. Parts by weight bear the same relation to parts by volume as the gram to the liter (S.T.P.).

*Example 1*

A solution of 2 parts of palladous chloride and 1,000 parts of 23% by weight aqueous nitric acid is placed in a stirred vessel. Ethylene is passed into the solution at 40° C. After seven hours, 35 parts by volume of ethylene has been absorbed and the concentration of nitric acid has fallen to 2%. The solution contains 59 parts of glyoxal (68% of the theory) with reference to ethylene and determined by selective precipitation with phenylhydrazine. The glyoxal may be recovered in the usual way.

Under otherwise the same conditions, the yield of glyoxal is 60.5 parts (69.5% of the theory) when using 2.5 parts of palladous nitrate as catalyst, and 58.5 parts (67% of the theory when using 3 parts of potassium tetrachloropalladate (II) as catalyst.

*Example 2*

0.5 parts of palladium is suspended in 1,000 parts of water and 20 parts by volume of ethylene, 10 parts by volume of nitrogen monoxide and 3 parts by volume of oxygen are passed in per hour. The palladium soon passes into solution and 25 parts of glyoxal is obtained after five hours.

Practically the same result is obtained by passing in 5 parts by volume of dinitrogen trioxide per hour instead of nitrogen monoxide and oxygen.

*Example 3*

20 parts by volume of ethylene, 5 parts by volume of nitrogen monoxide and 5 parts by volume of oxygen are passed per hour into a solution of 0.5 part of palladium chloride in 1,150 parts of 25% by weight aqueous nitric acid at 35° C. After eight hours, the solution contains 65% of the theory of glyoxal with reference to reacted ethylene. Supply of nitric oxide and oxygen is then discontinued and the palladium precipitated by passing further ethylene in. The palladium may be used for another batch.

The solution is freed from the last traces of palladium by means of an ion exchanger and worked up to glyoxal by distillation.

The yield of glyoxal under otherwise the same conditions but using 2 parts of dinitroso-palladous chloride as catalyst is 64.5% of the theory.

*Example 4*

14 parts by volume of ethylene and 10 parts by volume of nitrogen dioxide are passed per hour into 1,000 parts of water and 0.1 part of palladium chloride. A 3% by weight solution of glyoxal has been formed after four hours.

What we claim is:

1. A process for the production of glyoxal which comprises reacting ethylene with nitric acid in aqueous medium in the presence of a palladium salt as catalyst at a temperature between 0° and 100° C., the concentration of the nitric acid in the reaction mixture being between 1 and 40% by weight and the amount of palladium salt being more than 0.0001% by weight with reference to the reaction mixture.

2. A process as claimed in claim 1 wherein the reaction is carried out at 30° to 80° C.

3. A process as claimed in claim 1, wherein the catalyst is used in an amount of more than 0.01% by weight with reference to the reaction mixture.

4. A process as claimed in claim 1, wherein the concentration of nitric acid in the reaction mixture is between 2 and 20% by weight.

5. A process as claimed in claim 1, wherein the palladium salt is produced within the reaction mixture from a substance selected from the group consisting of palladium metal, palladous sulfide and palladous oxide hydrate.

6. A process as claimed in claim 1, wherein the nitric acid is produced at least in a part from at least one nitrogen oxide which yields nitric acid under the reaction conditions.

7. A process as claimed in claim 1, wherein the palladium salt is a salt selected from the group consisting of palladous chloride and palladous nitrate.

References Cited

UNITED STATES PATENTS 3,119,875   1/1964   Steinmetz et al. _____ 260—604

FOREIGN PATENTS 886,157   1/1962   Great Britain.

OTHER REFERENCES

Takeuchi: Chemical Abstracts, vol. 47, page 11915f (1953).

LEON ZITVER, *Primary Examiner.*

J. J. SETELIK, R. H. LILES, *Assistant Examiners.*